L. E. McKINNON.
ELECTRIC WELDING MACHINE.
APPLICATION FILED JUNE 17, 1908. RENEWED OCT. 28, 1912.

1,064,079.

Patented June 10, 1913.

Witnesses:
E. A. Jock
A. G. Dimond

Inventor
Lachlan E. McKinnon
by Wilhelm, Parker & Ward,
Attorneys.

UNITED STATES PATENT OFFICE.

LACHLAN E. McKINNON, OF BUFFALO, NEW YORK, ASSIGNOR TO McKINNON CHAIN COMPANY, OF BUFFALO, NEW YORK.

ELECTRIC WELDING-MACHINE.

1,064,079. Specification of Letters Patent. Patented June 10, 1913.

Application filed June 17, 1908, Serial No. 439,039. Renewed October 28, 1912. Serial No. 728,267.

*To all whom it may concern:*

Be it known that I, LACHLAN E. McKINNON, a subject of the King of Great Britain, residing at Buffalo, in the county of Erie and State of New York, have invented a new and useful Improvement in Electric Welding-Machines, of which the following is a specification.

This invention relates to means for controlling the current flowing through the circuit in which the welding electrodes are arranged in such manner that the welding circuit is interrupted periodically and at greater or less frequency, as the nature of the work may render desirable.

Figure 1:
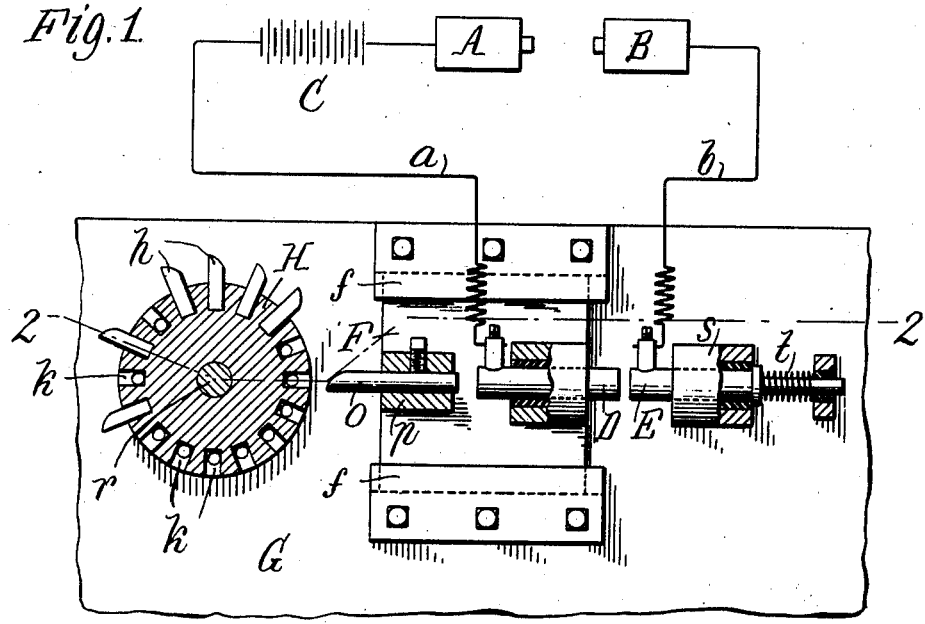
Figure 2:
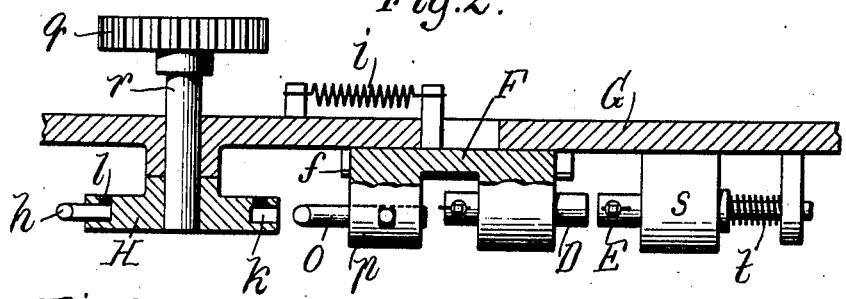
Figure 3:
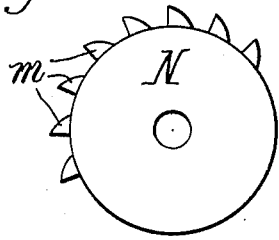
Figure 4:
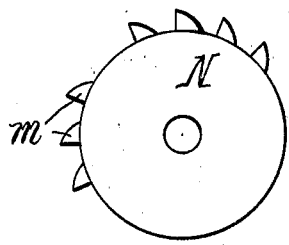

In the accompanying drawings: Figure 1 is a sectional elevation of a mechanism embodying my improvement. Fig. 2 is a horizontal section in line 2—2, Fig. 1. Figs. 3 and 4 are elevations, showing different forms of toothed wheels.

Like reference characters refer to like parts in the several figures.

A B represent the welding electrodes of any suitable construction and arrangement, $a\ b$ the conductors connected therewith, and C a source of electrical current connected with one of said conductors.

D E represent two contacts connected, respectively, with the conductors $a\ b$ and one movable with reference to the other so as to make and break the circuit periodically. As shown, the contact D is movable toward and from the contact E by being mounted on a carriage or slide F which is movable between guides $f$ on a supporting plate or frame G. This carriage is moved in one direction by a rotary toothed wheel H, and in the opposite direction by a spring $i$ connecting the carriage with the frame or otherwise suitably arranged.

The toothed wheel H, as shown in Figs. 1 and 2, is provided with a circumferential series of teeth, cams or wipers $h$ which are removably secured in sockets $k$ in the wheel by set screws $l$, so that the frequency with which the welding circuit is closed can be regulated. By removing some of the teeth the periods between contacts can be lengthened and by arranging the teeth more closely together the periods are shortened. The teeth can be arranged on the wheel in such manner as the nature of the work may render desirable.

By making the welding circuit intermittent, overheating of the welded articles and consequent injury to the material is prevented. The frequency of the contact periods can be regulated with reference to the size and shape of the articles to be welded, and the character and quality of the steel of which the articles are formed, and this frequency may be greater during one part of the revolution of the toothed wheel than during another.

In the construction of the toothed wheel represented in Figs. 3 and 4, the teeth $m$ are permanently secured to the wheel N but differently arranged on different wheels and the regulation of the contact periods is effected by substituting one wheel for another. The teeth act upon a suitable projection on the carriage or slide, for instance, as shown, a bolt or stud $o$ which is adjustably secured in a lug $p$ on the carriage. The toothed wheel is rotated by any suitable means from any suitable part of the welding machine, for instance, by a gear wheel $q$ mounted on its shaft $r$. The stationary contact E is preferably movable in its support $s$ and yieldingly held in position by a cushion spring $t$.

I claim as my invention:

1. The combination with welding electrodes and the circuit in which the same are arranged, of a make and break mechanism whereby the circuit is periodically opened and closed, while the welding electrodes are in welding relation to the work to produce an intermittent welding current, substantially as set forth.

2. The combination with welding electrodes and the circuit in which the same are arranged, of a make and break mechanism whereby the circuit is periodically opened and closed while the electrodes are in welding relation to the work to produce an intermittent welding current, and means whereby the frequency of the contact periods can be regulated, substantially as set forth.

3. The combination with welding electrodes and the circuit in which the same are arranged, of a make and break mechanism by which the circuit is periodically opened and closed while the electrodes are in welding relation to the work to produce an intermittent welding current, and means whereby the frequency of the contact periods can be varied and the circuit can be opened and closed at regular or irregular intervals, substantially as set forth.

4. The combination with welding electrodes and the circuit in which the same are arranged, of a make and break mechanism whereby the circuit is periodically opened and closed while the electrodes are in welding relation to the work to produce an intermittent welding current, and which comprises a rotary toothed wheel, the arrangement of the teeth of which is adapted to be changed for regulating the frequency of the contact periods, substantially as set forth.

5. The combination with welding electrodes and the circuit in which the same are arranged, of a make and break mechanism whereby the circuit is periodically opened and closed while the electrodes are in welding relation to the work to produce an intermittent welding current and which comprises a rotary wheel provided with removable teeth, and a movable contact actuated by said teeth, substantially as set forth.

6. The combination with welding electrodes and the circuit in which the same are arranged, of a make and break mechanism whereby the circuit is periodically opened and closed, while the welding electrodes are in welding relation to the work to produce an intermittent welding current and which comprises a stationary contact, a movable contact mounted on a slide which is movable toward and from the stationary contact, a rotary toothed wheel actuating the slide in one direction, and a return spring, substantially as set forth.

Witness my hand in the presence of two subscribing witnesses.

LACHLAN E. McKINNON.

Witnesses:
  EDWARD WILHELM,
  C. B. HORNBECK.